United States Patent
Jia et al.

(10) Patent No.: US 11,611,847 B2
(45) Date of Patent: *Mar. 21, 2023

(54) ANTENNA SELECTION AND DEVICE ORIENTATION

(71) Applicant: AT&T Intellectual Property I, L.P., Atlanta, GA (US)

(72) Inventors: Yupeng Jia, Austin, TX (US); William Knotts, Driftwood, TX (US); Donald Perciful, Round Rock, TX (US); Eric Zavesky, Austin, TX (US); James Pratt, Round Rock, TX (US); Miranda Huet, Austin, TX (US); Gregory Edwards, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/144,403

(22) Filed: Jan. 8, 2021

(65) Prior Publication Data

US 2021/0127231 A1  Apr. 29, 2021

Related U.S. Application Data

(63) Continuation of application No. 16/534,518, filed on Aug. 7, 2019, now Pat. No. 10,952,024.

(51) Int. Cl.
  *H04W 24/00*  (2009.01)
  *H04W 4/02*  (2018.01)
  *H04W 88/00*  (2009.01)

(52) U.S. Cl.
  CPC ........... *H04W 4/026* (2013.01); *H04W 88/00* (2013.01)

(58) Field of Classification Search
  CPC ....... H04W 4/026; H04W 4/02; H04W 88/00; H04W 64/00; H04W 24/00
  USPC .......... 455/561, 456.1, 67.11, 67.13
  See application file for complete search history.

(56) References Cited

U.S. PATENT DOCUMENTS

| | | |
|---|---|---|
| 10,148,304 B2 | 12/2018 | Chang et al. |
| 2010/0022848 A1 | 1/2010 | Lee et al. |
| 2019/0207836 A1 | 7/2019 | Bhimavarapu et al. |
| 2019/0280788 A1 | 9/2019 | Hardy et al. |

*Primary Examiner* — Temica M Beamer
(74) *Attorney, Agent, or Firm* — Guntin & Gust, PLC; Jay H. Anderson (57) ABSTRACT

Systems may provide feedback that may include antenna selection or mobile device configuration. Antennas may be automatically configured throughout the device or the orientation or location of the mobile device may be altered to increase performance. Historical performance information of the mobile device may be maintained in order to determine proactive manipulations of the mobile device. In addition, multiple mobile devices may cooperatively determine the orientation or location that may increase performance.

20 Claims, 7 Drawing Sheets

FIG. 7

ANTENNA SELECTION AND DEVICE ORIENTATION

CROSS-REFERENCE TO RELATED APPLICATION

This application is a continuation of U.S. patent application Ser. No. 16/534,518, filed on Aug. 7, 2019, entitled "ANTENNA SELECTION AND DEVICE ORIENTATION," which is incorporated by reference herein in its entirety.

TECHNICAL FIELD

The technical field generally relates to device performance and, more specifically, to systems and methods for managing the configuration of antennas and device orientation.

BACKGROUND

Today's wireless devices, such as laptops and computers that connect wirelessly to the cellphone network or internet must use antennas to transmit and receive wireless energy to and from the device. Today's cellphones and laptops typically require multiple antennas, each antenna designed for resonance or desired performance at a particular frequency band, wherein the performance of the wireless device may depend on many factors such as terrain, location, and antenna configuration.

SUMMARY

Disclosed herein are methods, systems, and apparatuses that may provide feedback that may include antenna selection or mobile device configuration. Antennas may be automatically configured throughout the device or the orientation or location of the mobile device may be altered to increase performance. Historical performance information of the mobile device may be maintained in order to determine proactive manipulations of the mobile device. In addition, multiple mobile devices may cooperatively determine the orientation or location that may increase performance at a given location.

In an example, an apparatus may include a processor and a memory coupled with the processor that effectuates operations. The operations may include turning on a first device, wherein the first device may be a mobile device; obtaining information associated with the first device, wherein the information associated with the first device may include orientation information in space, such as upside down (e.g., gyroscope information) or position of antennas; based on the information, determining recommended configuration of the first device in order to reach a threshold performance; and sending an alert about the recommended configuration, wherein the alert comprises a message on a graphical user interface, a sound, or haptic feedback.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

Mobile devices may have increased signal strength or increased throughput when in certain configurations. Disclosed herein are methods, systems, and apparatuses that may provide feedback that may include antenna selection or mobile device configuration. Antennas may be automatically configured throughout the device or the orientation or location of the mobile device may be altered to increase performance. Historical performance information of the mobile device may be maintained in order to determine proactive manipulations of the mobile device. In addition, multiple mobile devices may cooperatively determine the orientation or location that may increase performance at a given location.

Figure 1:
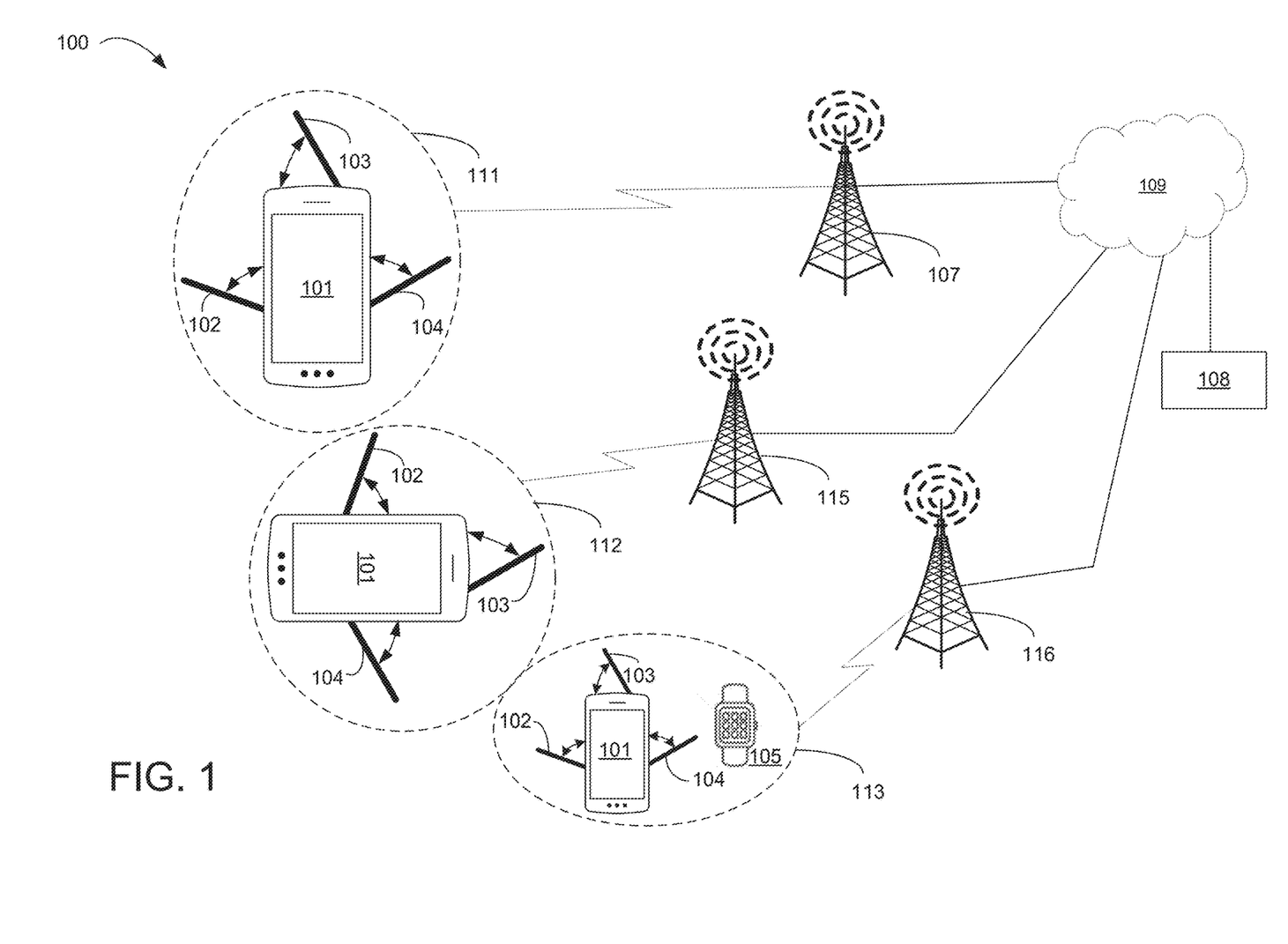
FIG. 1 illustrates an exemplary system that may implement antenna selection and device orientation.

FIG. 1 illustrates an exemplary system that may implement antenna selection and device orientation, as disclosed herein. System 100 may include mobile device 101, mobile device 105, base station 107, base station 115, base station 116, device 108 (e.g., server or repository), or network 109 (e.g., Internet), which may be communicatively connected with each other. Mobile device 101 may have one or more antennas, such as antenna 102, antenna 103, or antenna 104.

As disclosed in more detail herein the one or more antennas may be repositioned or otherwise altered (e.g., opened or closed; or activated deactivated) based on an attempt to increase signal strength or other performance parameters for mobile device 101. In an example, antenna 102 may move along a horizontal or vertical track of mobile device 101 or base station 107. Mobile device 101 may include a mobile phones tablet, laptop, smart watch, unmanned or autonomous vehicle (e.g., land, water, or air), or internet of things (IoT) device, such as healthcare-related body wearables. Device 108 may compute or store information, such as historical or other information (e.g., mobile device 101 signal strength at a location or orientation) and provide the information to one or mobile devices.

With continued reference to FIG. 1, briefly disclose scenarios that in which the disclosed subject matter may be associated with. In a first scenario, mobile device 101 may be in coverage area 111 at some time t0. Mobile device 101 may be oriented in a vertical position as it relates to the ground. In an example, mobile device 101 may automatically orient itself (e.g., a rotating IoT device) while using gyro-based sensors to determine the orientation. In addition, while in coverage area 111, mobile device 101 may have antenna 102, antenna 103, and antenna 104 opened at about a 45-degree angle relative to mobile device 101. This configuration of mobile device 101 may have been determined to be optimal for the performance of mobile device

101 at the location at time t0. In a second scenario, mobile device 101 may be in coverage area 112 at some time t1. Mobile device 101 may be oriented in a horizontal position as it relates to the ground.

In addition, while in coverage area 111, mobile device 101 may have antenna 102, antenna 103, and antenna 104 opened at different angles each relative to mobile device 101. This configuration of mobile device 101 may have been determined to be optimal for the performance of mobile device 101 at the location at time t1. In a third scenario, mobile device 101 may be in coverage area 113 at some time t2. Mobile device 101 may be oriented in a vertical position as it relates to the ground. In addition, while in coverage area 111, mobile device 101 may have antenna 102, antenna 103, and antenna 104 opened at different angles each relative to mobile device 101. Further, there may be a nearby mobile device 105 (e.g., a mobile watch) that may be used to assist in the performance. Mobile device 101 may use case (e.g., phone case) to integrate antenna 102, antenna 103, or antenna 104. This case may be used when needed in the configuration of mobile device 101. This configuration of mobile device 101 in relation to mobile device 105 may have been determined to be optimal for the performance of mobile device 101 at the location at time t1. It is contemplated that antenna 102, for example, may be chosen to avoid light, electromagnetic waves, or heat occlusions as detected by local sensors. For example, users may have concerns about the cell signal passing through them or would want the antenna to move away from their hand.

Figure 2:
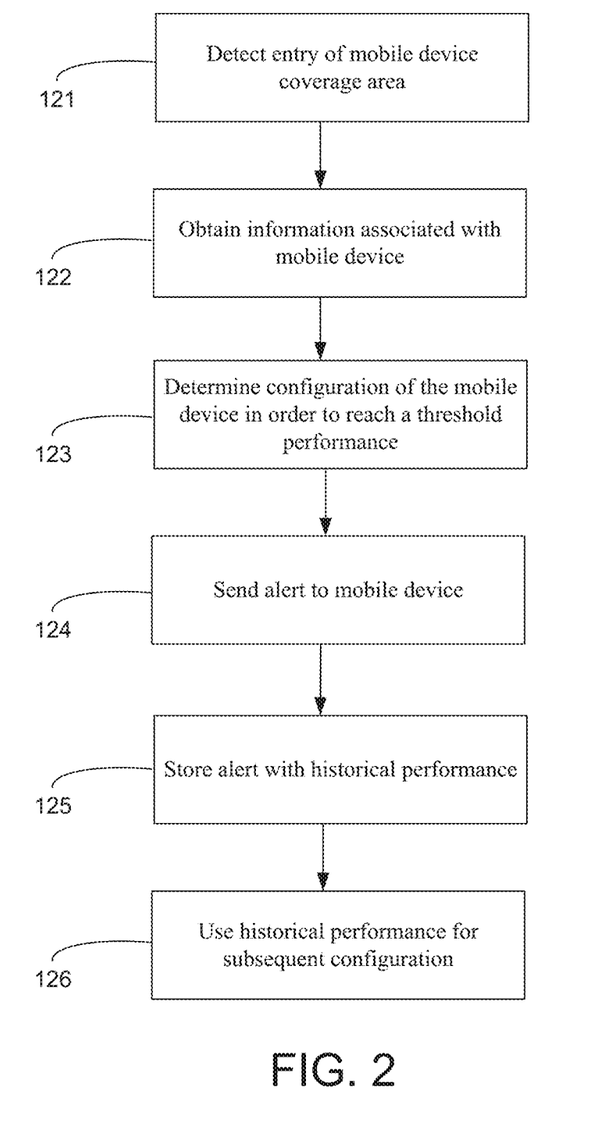
FIG. 2 illustrates an exemplary method for implementing antenna selection and device orientation.

FIG. 2 illustrates an exemplary method for implementing antenna selection and device orientation. At step 121, mobile device 101 may enter coverage area 111. At step 122, based on entering the coverage area, mobile device 101 may obtain (e.g., receive) information associated with mobile device 101. The information associated with mobile device 101 may include: 1) current signaling information associated with mobile device 101 (e.g., signal-to-noise ratio or signal strength), 2) orientation information in space, such as upside down (e.g., gyroscope information) 3) location information (e.g., GPS coordinates), 4) other sensor information for mobile device 101 (e.g., acceleration, position, orientation, speed), 5) usage information for the mobile device 101 (e.g., voice, video, web, bursty, instant, etc.), 6) utilization information (e.g., utilization of processor, memory, data traffic—throughput, etc.), 7) device state information (e.g., sleep mode or test mode), 8) number or position of antennas, or 9) number or position of nearby devices, among other things.

With continued reference to FIG. 2, at step 123, based on the information, determine recommended configuration of the first device in order to reach a threshold performance. For example, within a 5 feet radius horizontally and vertically in relation to the current position of mobile device 101, a recommended configuration may include the physical position of the antenna on the phone (e.g., antenna 102 opened and antenna 103 closed), the physical location of the device (e.g., a particular GPS coordinates), or the orientation of the phone (e.g., vertical or horizontal).

At step 124, based on the determined recommendation, an alert may be sent. For example, mobile device 101 may receive a message on a graphical user interface, a sound, or haptic feedback. This alert may inform the user to make the recommended change or trigger automatic changes of mobile device 101.

At step 125, the results of step 121—step 124 may be stored. For example, the performance of mobile device 101 may be stored as historical performance data. The historical performance data may include, at a particular time, the signal strength, throughput, GPS location, orientation, and other information. At step 126, the historical performance data may be used to determine subsequent recommended configurations of mobile device 101 (e.g., GPS location or antenna use for mobile device). The subsequent determination or providing of the recommendation via the alert may be triggered based on device location, time (e.g., amount of time since last determination), performance issues (e.g., reach a minimum threshold performance), type of applications executing on mobile device 101, or other information.

Figure 3:
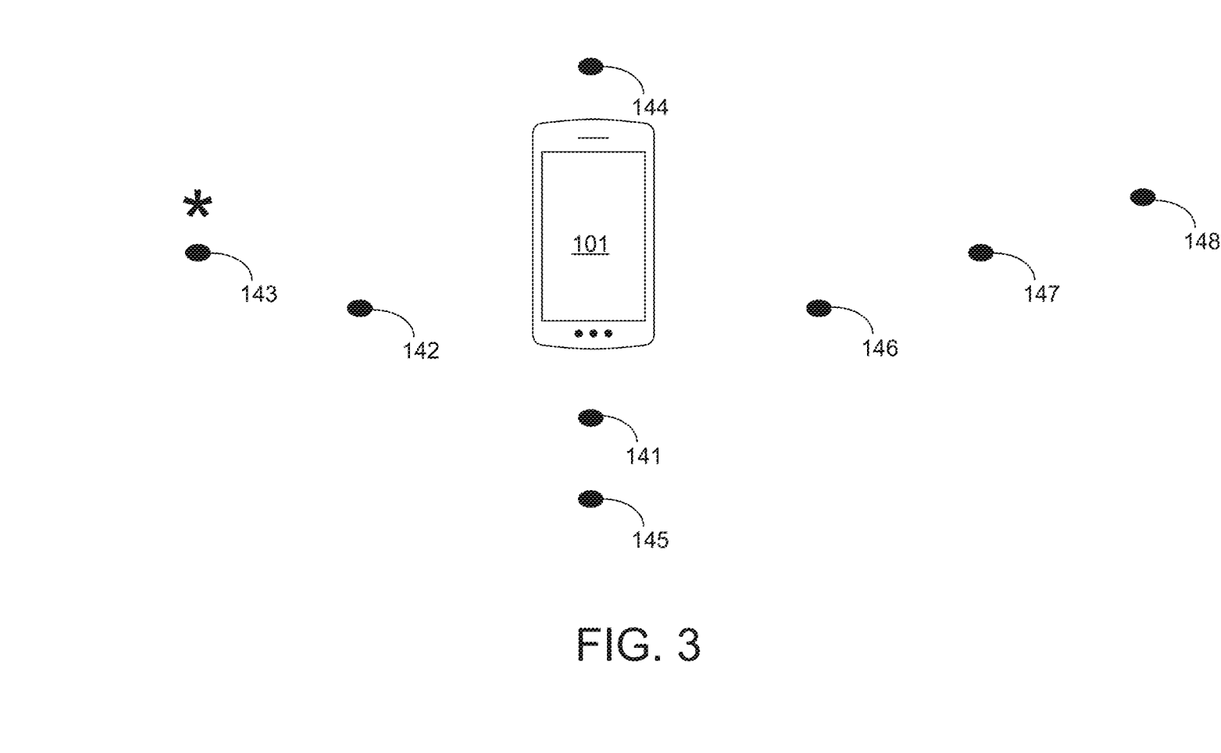
FIG. 3 illustrates an exemplary scenario associated with implementing antenna selection or device orientation.
Figure 4:
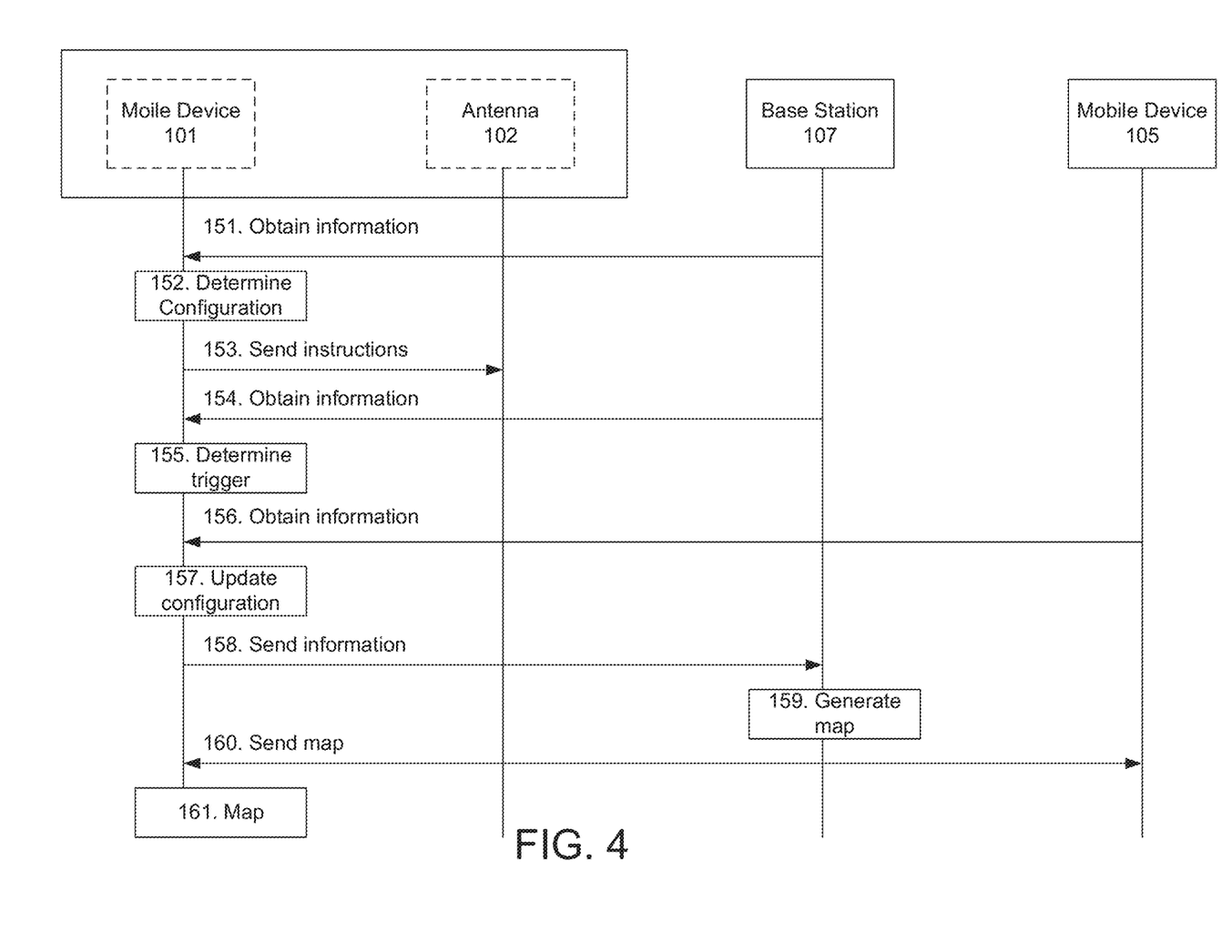
FIG. 4 illustrates an exemplary method flow for antenna selection and device orientation.

FIG. 3 illustrates an exemplary scenario associated with the managing of antenna selection or device orientation (e.g., steps of FIG. 2 or FIG. 4). As shown, mobile device 101 may be at a current position 141. There are also other positions, position 142 through position 148, in which mobile device 101 has been located and the analysis of one or more steps of FIG. 2 has been completed. In an example, mobile device 101 may provide alerts based on the information of FIG. 3. For example, a graphical user interface may display the information of FIG. 3 and recommend mobile device 101 be operated at a particular position (e.g., position 143). In an example, a mapping programming may not only provide directions to a destination, but also provide configurations of mobile device 111 that would provide a threshold performance (e.g., a threshold signal strength). In addition, the programming may provide the estimated performance for multiple configurations (e.g., antenna position or device orientation) along one or multiple paths to a destination. Paths may be filtered out based on device orientation, antenna position, or some other configuration.

FIG. 4 illustrates an exemplary method flow for antenna selection and device orientation, as disclosed herein. At step 151, mobile device 101 may obtain information associated with it at time period t3. For example, signal strength, noise-to-signal ratio, throughput, types of applications, location, antenna position, or device orientation, among other things. At step 152, based on the information of step 151, the configuration to a threshold performance of mobile device 101 may be determined. As disclosed herein, configuration may be associated with the antenna positioning, device orientation, device location. At step 153, instructions may be provided for implementing the determined configuration of step 152. For example, in this step, there may be a selection to just use an antenna 102 or a reorientation of antenna 102.

At step 154, additional information, at time period t4, may be obtained associated with mobile device 101. At step 155, based on this additional information, mobile device 101 may determine the next trigger to obtain information from devices (e.g., mobile device 105 or base station 107) or determine the configuration of mobile device 101 in order to reach a threshold performance. For example, the next trigger may be to reach a first threshold, such as GPS location, time period, or utilization (e.g., processor, bandwidth, or memory).

At step 156, at time period t5, mobile device 101 may obtain information associated with mobile device 105 based on reaching a threshold (e.g., threshold of step 155). In an example, mobile device 101 may obtain signal strength or other information of mobile device 105 at different locations. At step 157, based on the information of step 156, mobile device 101 may update its configuration. At step 158, mobile device 101 may transmit information (e.g., signal strength at multiple locations) to base station 107, which may occur over time (e.g., days, weeks, or months). This information be termed historical information. At step 159, based on information of step 158, base station 107 may generate a map or table that may be associated with mobile device 101 (or other mobile devices) during a time of the day. For example, the map or table may include a moving average of signal strength for GPS coordinates during a period of time or configurations of mobile device 101 at different GPS coordinates during a period of time. This may be for a particular device setup (e.g., mobile device 101) or for multiple mobile devices (e.g., mobile device 101 and mobile device 105). At step 160, base station 107 may send the map or table of step 159 to mobile device 101 or other devices (e.g., mobile device 105). At step 161, mobile device 101 may display the map or table of step 160. The map may be a map that provides directions to a particular destination based on criteria, a heat map, or the like.

In an exemplary scenario, mobile device 101 may obtain information from mobile devices for possible antenna piggyback. In this situation, a device that is closer to a tower with a stronger signal can be used to boost the signal to aid nearby devices that may experience weaker connection due to building materials, etc. In order to determine which communication configuration to piggyback, mobile device 101 may compare probe results from local devices (e.g., mobile device 105). Mobile device 101 may bid to participate with mobile device 105 to join. In this scenario, base station 107 may inform mobile device 101 of mobile device 105 with a higher signal strength or other performance measure. Other devices may be embedded (e.g., embedded or implanted IoT device) into a human and may be utilized as a signal boost or alternate antenna through secondary mechanisms (e.g., bone conduction). Orientation parameters may be estimated for particular model of mobile device 105 (device, radio, etc.). Models may also be predicted between different device operation modes (e.g., fixed or mobile classification).

The functions as disclosed (e.g., FIG. 1-FIG. 4) may occur in one device, such as device 108, base station 115, or mobile device 105, or may be distributed among multiple devices. The more mobile devices that are generally involved in this system, the more accurate the system may be. It is envisioned that software applications may take advantage of the disclosed system to more efficiently download, upload, or otherwise operate on mobile devices.

Figure 5:
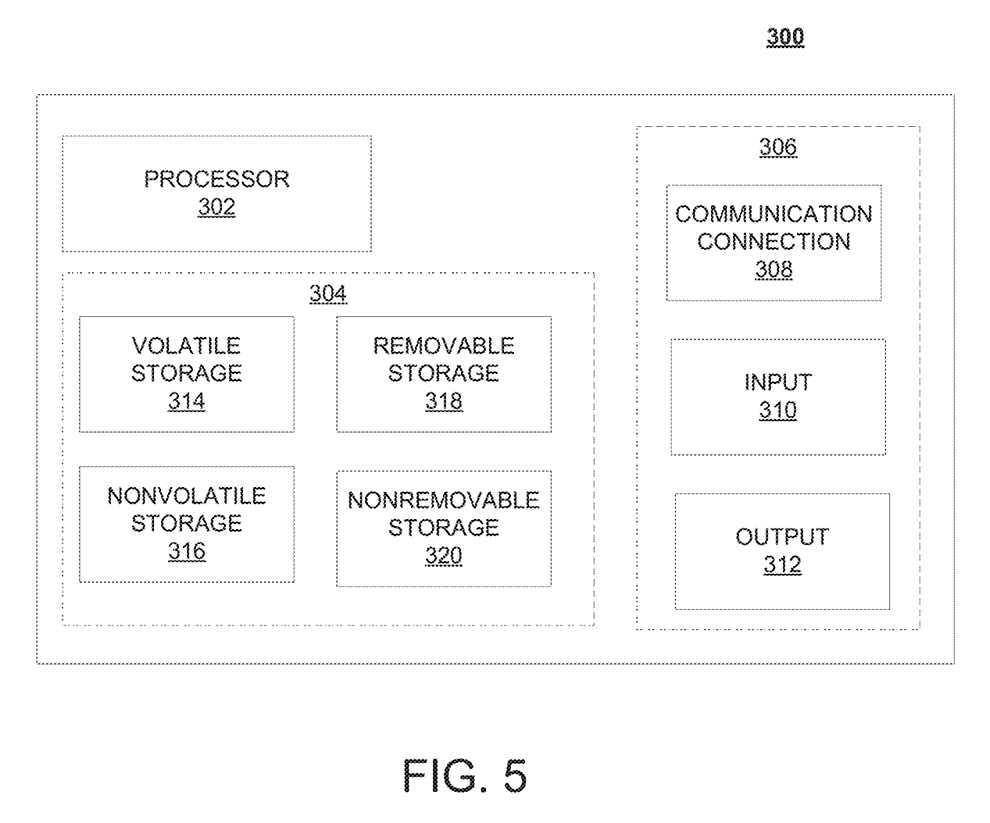
FIG. 5 illustrates a schematic of an exemplary network device.

FIG. 5 is a block diagram of network device 300 that may be connected to or comprise a component of system 100. Network device 300 may comprise hardware or a combination of hardware and software. The functionality to facilitate telecommunications via a telecommunications network may reside in one or combination of network devices 300. Network device 300 depicted in FIG. 5 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 5 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 5) to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 6:
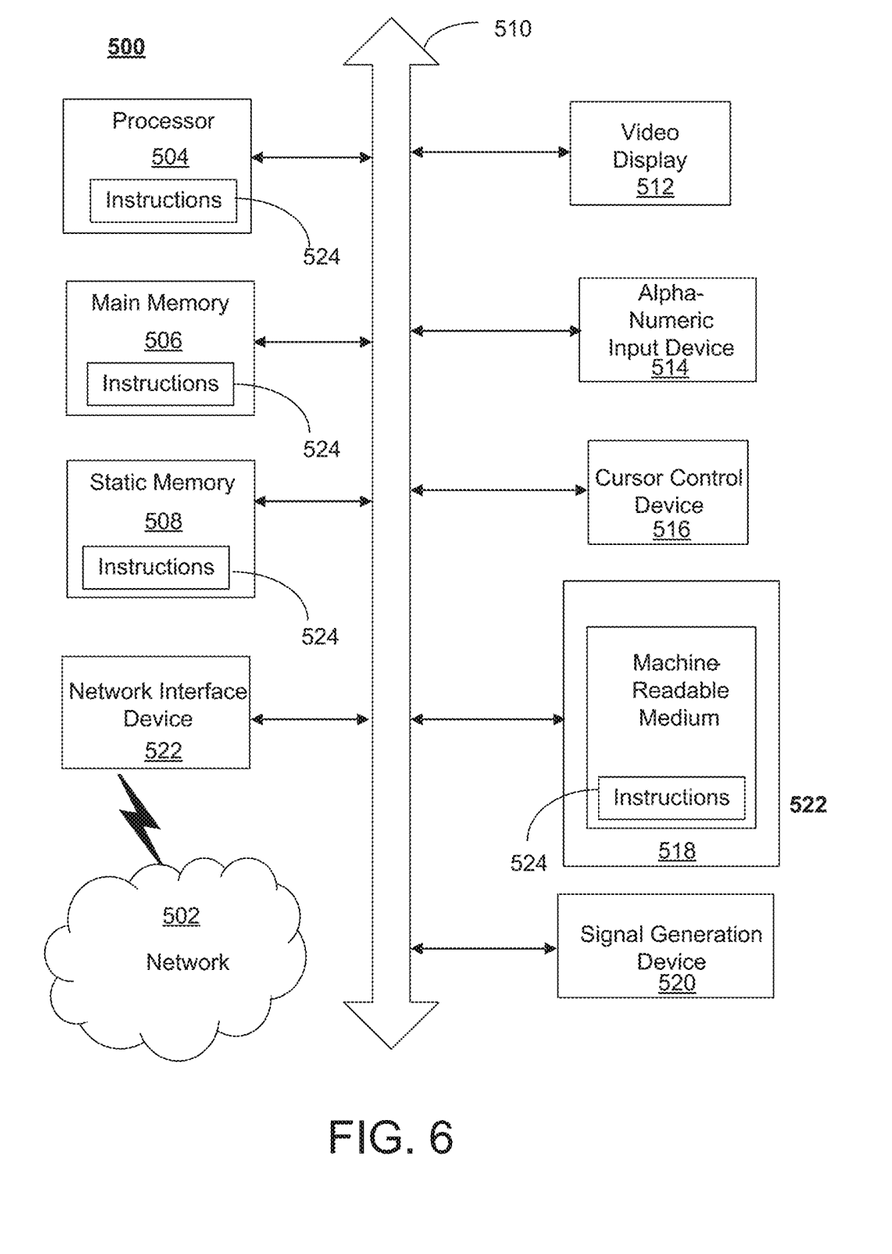
FIG. 6 illustrates an exemplary communication system that provides wireless telecommunication services over wireless communication networks.

FIG. 6 depicts an exemplary diagrammatic representation of a machine in the form of a computer system 500 within which a set of instructions, when executed, may cause the machine to perform any one or more of the methods described above. One or more instances of the machine can operate, for example, as processor 302, mobile device 101, mobile device 105, base station 107, base station 115, base station 116, device 108, or other devices of FIG. 1. In some examples, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the examples described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 7:
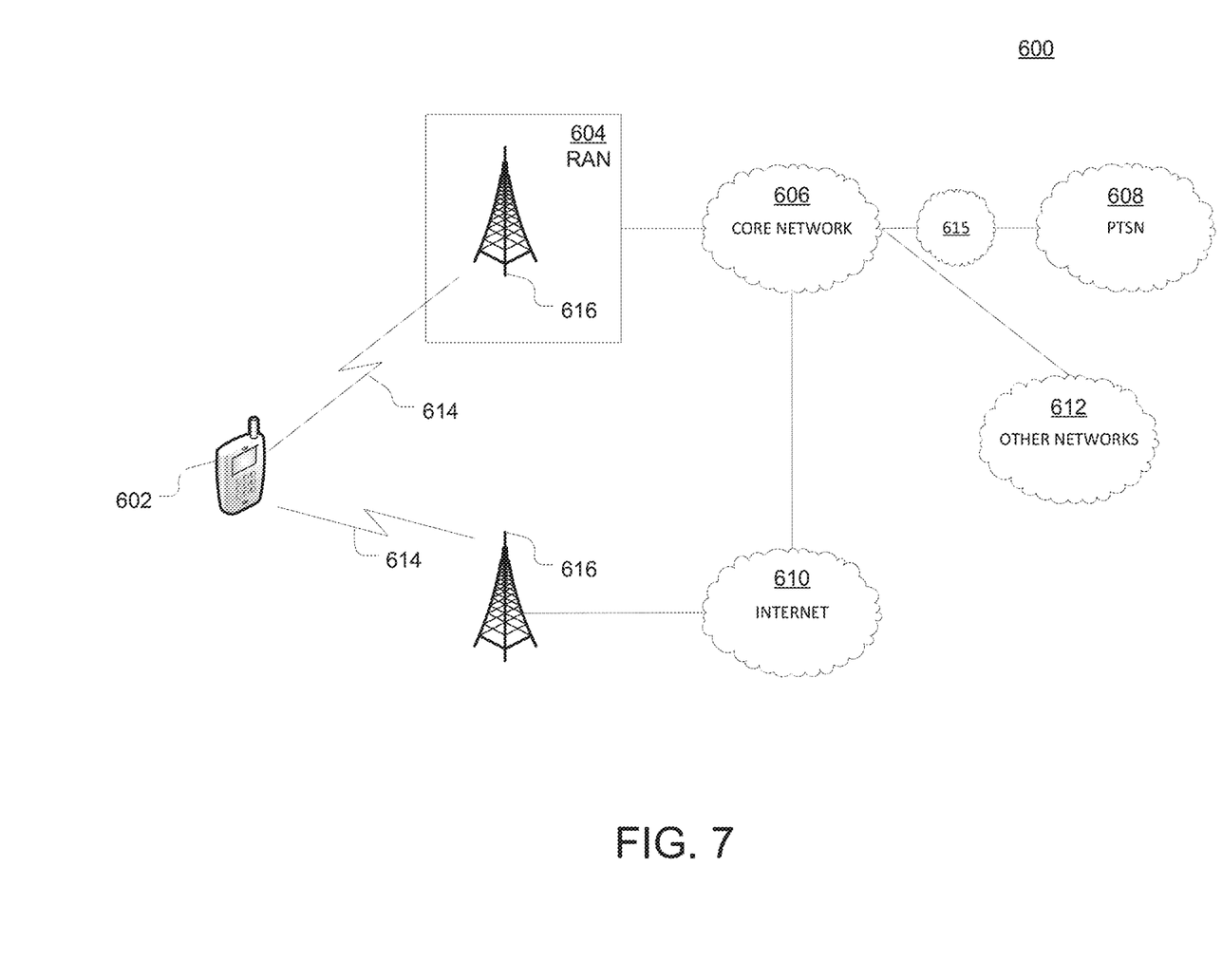
FIG. 7 illustrates an exemplary telecommunications system in which the disclosed methods and processes may be implemented.

As shown in FIG. 7, telecommunication system 600 may include wireless transmit/receive units (WTRUs) 602, a RAN 604, a core network 606, a public switched telephone network (PSTN) 608, the Internet 610, or other networks 612, though it will be appreciated that the disclosed examples contemplate any number of WTRUs, base stations, networks, or network elements. Each WTRU 602 may be any type of device configured to operate or communicate in a wireless environment. For example, a WTRU may comprise mobile device 101, mobile device 107, network device 300, or the like, or any combination thereof. By way of example, WTRUs 602 may be configured to transmit or receive wireless signals and may include a UE, a mobile station, a fixed or mobile subscriber unit, a pager, a cellular telephone, a PDA, a smartphone, a laptop, a netbook, a personal computer, a wireless sensor, consumer electronics, or the like. It is understood that the exemplary devices above may overlap in their functionality and the terms are not necessarily mutually exclusive. WTRUs 602 may be configured to transmit or receive wireless signals over an air interface 614.

Telecommunication system 600 may also include one or more base stations 616. Each of base stations 616 may be any type of device configured to wirelessly interface with at least one of the WTRUs 602 to facilitate access to one or more communication networks, such as core network 606, PTSN 608, Internet 610, or other networks 612. By way of example, base stations 616 (e.g., base station 107) may be a base transceiver station (BTS), a Node-B, an eNode B, a Home Node B, a Home eNode B, a site controller, an access point (AP), a wireless router, gNB, or the like. While base stations 616 are each depicted as a single element, it will be appreciated that base stations 616 may include any number of interconnected base stations or network elements.

RAN 604 may include one or more base stations 616, along with other network elements (not shown), such as a base station controller (BSC), a radio network controller (RNC), or relay nodes. One or more base stations 616 may be configured to transmit or receive wireless signals within a particular geographic region, which may be referred to as a cell (not shown). The cell may further be divided into cell sectors. For example, the cell associated with base station 616 may be divided into three sectors such that base station 616 may include three transceivers: one for each sector of the cell. In another example, base station 616 may employ multiple-input multiple-output (MIMO) technology and, therefore, may utilize multiple transceivers for each sector of the cell.

Base stations 616 may communicate with one or more of WTRUs 602 over air interface 614, which may be any suitable wireless communication link (e.g., RF, microwave, infrared (IR), ultraviolet (UV), or visible light). Air interface 614 may be established using any suitable radio access technology (RAT).

More specifically, as noted above, telecommunication system 600 may be a multiple access system and may employ one or more channel access schemes, such as CDMA, TDMA, FDMA, OFDMA, SC-FDMA, or the like. For example, base station 616 in RAN 604 and WTRUs 602 connected to RAN 604 may implement a radio technology such as Universal Mobile Telecommunications System (UMTS) Terrestrial Radio Access (UTRA) that may establish air interface 614 using wideband CDMA (WCDMA). WCDMA may include communication protocols, such as High-Speed Packet Access (HSPA) or Evolved HSPA (HSPA+). HSPA may include High-Speed Downlink Packet Access (HSDPA) or High-Speed Uplink Packet Access (HSUPA).

As another example base station 616 and WTRUs 602 that are connected to RAN 604 may implement a radio technology such as Evolved UMTS Terrestrial Radio Access (E-UTRA), which may establish air interface 614 using LTE or LTE-Advanced (LTE-A).

Optionally base station 616 and WTRUs 602 connected to RAN 604 may implement radio technologies such as IEEE 602.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), GSM, Enhanced Data rates for GSM Evolution (EDGE), GSM EDGE (GERAN), or the like.

Base station 616 may be a wireless router, Home Node B, Home eNode B, or access point, for example, and may utilize any suitable RAT for facilitating wireless connectivity in a localized area, such as a place of business, a home, a vehicle, a campus, or the like. For example, base station 616 and associated WTRUs 602 may implement a radio technology such as IEEE 602.11 to establish a wireless local area network (WLAN). As another example, base station 616 and associated WTRUs 602 may implement a radio technology such as IEEE 602.15 to establish a wireless personal area network (WPAN). In yet another example, base station 616 and associated WTRUs 602 may utilize a cellular-based RAT (e.g., WCDMA, CDMA2000, GSM, LTE, LTE-A, etc.) to establish a picocell or femtocell. As shown in FIG. 7, base station 616 may have a direct connection to Internet 610. Thus, base station 616 may not be required to access Internet 610 via core network 606.

RAN 604 may be in communication with core network 606, which may be any type of network configured to provide voice, data, applications, and/or voice over internet protocol (VoIP) services to one or more WTRUs 602. For example, core network 606 may provide call control, billing services, mobile location-based services, pre-paid calling, Internet connectivity, video distribution or high-level security functions, such as user authentication. Although not shown in FIG. 7, it will be appreciated that RAN 604 or core network 606 may be in direct or indirect communication with other RANs that employ the same RAT as RAN 604 or a different RAT. For example, in addition to being connected to RAN 604, which may be utilizing an E-UTRA radio technology, core network 606 may also be in communication with another RAN (not shown) employing a GSM radio technology.

Core network 606 may also serve as a gateway for WTRUs 602 to access PSTN 608, Internet 610, or other networks 612. PSTN 608 may include circuit-switched telephone networks that provide plain old telephone service (POTS). For LTE core networks, core network 606 may use IMS core 615 to provide access to PSTN 608. Internet 610 may include a global system of interconnected computer networks or devices that use common communication protocols, such as the transmission control protocol (TCP), user datagram protocol (UDP), or IP in the TCP/IP internet protocol suite. Other networks 612 may include wired or wireless communications networks owned or operated by other service providers. For example, other networks 612 may include another core network connected to one or more RANs, which may employ the same RAT as RAN 604 or a different RAT.

Some or all WTRUs 602 in telecommunication system 600 may include multi-mode capabilities. For example, WTRUs 602 may include multiple transceivers for communicating with different wireless networks over different wireless links. For example, one or more WTRUs 602 may be configured to communicate with base station 616, which may employ a cellular-based radio technology, and with base station 616, which may employ an IEEE 802 radio technology.

As described herein, a telecommunications system wherein management and control utilizing a software defined network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system in which managing antenna selection or device orientation alerts can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes an device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses of the subject matter of the present disclosure—managing antenna selection or device orientation—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. In addition, the use of the word "or" is generally used inclusively unless otherwise provided herein.

This written description uses examples to enable any person skilled in the art to practice the claimed subject matter, including making and using any devices or systems and performing any incorporated methods. The patentable scope is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

Methods, systems, and apparatuses, among other things, as described herein may provide for managing antenna selection or device orientation. A method, system, computer readable storage medium, or apparatus providing for turning on a first device, wherein the first device may be a mobile device; obtaining information associated with the first device, wherein the information associated with the first device comprises: 1) current signaling information associated with first device, 2) orientation information at a location, such as upside down (e.g., gyroscope information) 3) location information (e.g., GPS), 4) other sensor information for first device (e.g., acceleration, position, orientation, speed), 5) usage information for the first device (e.g., voice, video, web, bursty, instant, etc.), 6) utilization (e.g., processor, memory, data traffic—throughput, etc.), 7) device state (e.g., sleep mode or test mode), 8) number or position of antennas, or 9) number or position of nearby devices; based on the information, determining recommended configuration of the first device in order to reach threshold performance; and sending an alert about the recommended configuration, wherein the alert comprises a message on a graphical user interface, a sound, or haptic feedback. The method, system, computer readable storage medium, or apparatus provides for based on the configuration of the first device and the information, determining whether to activate one or more antennas on the first device; store the performance of the first device as historical performance data, wherein the historical performance data comprises the information and the performance; and subsequently using the historical performance data to determine recommended configuration or antenna use for the first device, when the first device changes a location (e.g., 5 feet or coordinates X, Y, Z) or after a period of time (e.g., 2 minutes). The information may include an indication by a second device (e.g., remote device) performance at particular locations or configurations for the second device. The information may include a recommended configuration for both the first device and the neighboring device(s) with collaboration established such that they both receive a threshold performance through cooperation. The information may include a recommendation by a second device (e.g., remote device) of a location or configuration to achieve a signal performance level. The determination of the recommended configuration or location may be based on a heat map created based on the historical performance data of the first device, the second device, or group of devices. The information may include a recommended configuration for both the first device and the second device such that they both receive a threshold performance through cooperation. The determination of the recommended configuration or location may be based on a machine learning algorithm that has used the historical performance data of the first device, the second device, or group of devices. All combinations in this paragraph (including the removal or addition of steps) are contemplated in a manner that is consistent with the other portions of the detailed description. The functions as disclosed (e.g., FIG. 1-FIG. 4) may occur in other devices, such as device 108, or be distributed among multiple devices.

What is claimed:

1. A method comprising:
   receiving, by a processor, information associated with a first mobile device, wherein the information associated with the first mobile device comprises: current signaling information associated with first device or orientation information of the first mobile device;
   based on the information, determining, by the processor, a configuration of the first mobile device in order to reach threshold performance; and
   providing, by the processor, instructions to implement the determined configuration, wherein the instructions comprise the selection of an antenna or reorientation of the antenna.

2. The method of claim 1, wherein the information comprises performance information of a second mobile device at multiple locations.

3. The method of claim 1, wherein the information comprises a recommended configuration of the first mobile device by a second mobile device, wherein the recommended configuration comprises a location to achieve a signal performance level of the first mobile device.

4. The method of claim 1, wherein the determining the configuration is based on historical performance data of the first mobile device and a second mobile device.

5. The method of claim 1, wherein the determining the configuration is based on a machine learning algorithm that uses historical performance data of the first mobile device and a second mobile device.

6. The method of claim 1, wherein the information comprises a recommended configuration for the first mobile device and a neighboring device to collaborate such that the first mobile device and the neighboring device reach the threshold performance.

7. The method of claim 1, wherein the determining the configuration of the first mobile device comprises determining whether to activate one or more antennas on the first mobile device.

8. The method of claim 1, wherein the determining the configuration of the first mobile device occurs based on a location of the first mobile device in relation to a base station.

9. A system comprising:
one or more processors; and
memory coupled with the one or more processors, the memory storing executable instructions that when executed by the one or more processors cause the one or more processors to effectuate operations comprising:
receiving information associated with a first mobile device, wherein the information associated with the first mobile device comprises: current signaling information associated with first device or orientation information of the first mobile device;
based on the information, determining a configuration of the first mobile device in order to reach threshold performance; and
providing instructions to implement the determined configuration, wherein the instructions comprise the selection of an antenna or reorientation of the antenna.

10. The system of claim 9, the operations further comprising providing instructions to generate a map or table associated with the first mobile device during a time of the day.

11. The system of claim 9, the operations further comprising providing instructions to generate a map or table associated with the first mobile device during a period of time, wherein the map or table comprises a moving average of signal strength of the first mobile device for coordinates during the period of time.

12. The system of claim 9, the operations further comprising providing instructions to generate a map or table associated with the first mobile device during a period of time, wherein the map or table comprises configurations of the first mobile device at different coordinates during the period of time.

13. The system of claim 9, wherein the determining the configuration is based on historical performance data of the first mobile device and a second mobile device.

14. The system of claim 9, wherein the determining the configuration is based on a machine learning algorithm that uses historical performance data of the first mobile device and a second mobile device.

15. The system of claim 9, wherein the information comprises a recommended configuration for the first mobile device and a neighboring device to collaborate such that the first mobile device and the neighboring device reach the threshold performance.

16. The system of claim 9, wherein the determining the configuration of the first mobile device occurs based on a location of the first mobile device in relation to a base station.

17. A non-transitory computer readable storage medium storing executable instructions that when executed by a computing device cause said computing device to effectuate operations comprising:
receiving information associated with a first mobile device, wherein the information associated with the first mobile device comprises: current signaling information associated with first device or orientation information of the first mobile device;
based on the information, determining a configuration of the first mobile device in order to reach threshold performance; and
providing instructions to implement the determined configuration, wherein the instructions comprise the selection of an antenna or reorientation of the antenna.

18. The non-transitory computer readable storage medium of claim 17, the operations further comprising providing instructions to generate a map or table associated with the first mobile device during a time of the day.

19. The non-transitory computer readable storage medium of claim 17, the operations further comprising providing instructions to generate a map or table associated with the first mobile device during a period of time, wherein the map or table comprises a moving average of signal strength of the first mobile device for coordinates during the period of time.

20. The non-transitory computer readable storage medium of claim 17, the operations further comprising providing instructions to generate a map or table associated with the first mobile device during a period of time, wherein the map or table comprises configurations of the first mobile device at different coordinates during the period of time.

* * * * *